United States Patent
Nagahara

[11] Patent Number: 5,999,338
[45] Date of Patent: Dec. 7, 1999

[54] IMAGING LENS

[75] Inventor: Akiko Nagahara, Koshigaya, Japan

[73] Assignee: Fuji Photo Optical Co., Ltd., Omiya City, Japan

[21] Appl. No.: 09/186,440

[22] Filed: Nov. 5, 1998

[51] Int. Cl.⁶ .............................. G02B 9/04; G02B 3/02
[52] U.S. Cl. ......................... 359/793; 359/717; 359/757
[58] Field of Search .................................. 359/793, 717, 359/757

[56] References Cited

U.S. PATENT DOCUMENTS 5,699,202  12/1997  Yamamoto ............................ 359/793

FOREIGN PATENT DOCUMENTS 09-80302  3/1997  Japan .

Primary Examiner—Georgia Epps
Assistant Examiner—Evelyn A. Lester
Attorney, Agent, or Firm—Arnold International; Bruce Y. Arnold

[57] ABSTRACT

An imaging lens with a wide image angle, that is compact and bright, is composed of a first lens group of negative refracting power which has three lens elements which are of positive, negative, and positive refracting power, respectively, and a second lens group of positive refracting power. By providing the first lens element on the object side of the first lens group with an aspherical surface, and by fixing the range of the spacing between the first lens element and the second lens element to satisfy a first condition, as well as fixing the spacing between the second lens element and the third lens element to satisfy a second condition, the distortion of the imaging lens is reduced and its resolution is increased.

15 Claims, 15 Drawing Sheets

EMBODIMENT 6
COMA

IMAGING LENS

BACKGROUND OF THE INVENTION

In recent years, solid-state image sensors have been widely used at the imaging surface of video cameras, still cameras, and the like. These solid-state image sensors have been miniaturized as technology has advanced. Accompanying this trend, there has been an increased demand for a more compact photographic lens having a wider viewing angle than previously available.

Recently, there has been a large increase in demand for digital still cameras, and various data types are now frequently put into a photographic record. Distortion resulting from the photographic lens is quite conspicuous in this sort of photographic recording of data where the photographic subject data comprises, for example, the wording of a business card or a table format. This is because these subjects generally include an image that is rectangular in shape and is located near the periphery of the image, as results from photographing the outer dimensions of a business card, the framework of a table, or the like. Accordingly, it is strongly desired that the distortion of a photographic lens used in this type of camera be kept small. In order to realize a wide image angle, it is advantageous to use an imaging lens of the retro focus type. However, in an imaging lens of the retro focus type, it is necessary to correct the various aberrations that are generated by the negative lens element having a large aperture that is arranged on the object side.

In order to accomplish this, it is thought that, by arranging a convex lens element with low refracting power on the extreme object side in an imaging lens of the retro focus type, the distortion will be corrected. An example of this approach, which uses a biconvex lens element arranged on the extreme object side, is Japanese laid open Patent Publication No. H09-80302. However, the imaging lens is insufficient in that its f-number is too large (2.8) to yield a bright image and, in addition, the width of the image angle (i.e., the field of view) and distortion certainly could not be said to be desirable.

BRIEF SUMMARY OF THE INVENTION

The present invention relates to an imaging lens and, more specifically, to a photographic lens for use in digital still cameras that is also suitable for use as a photographic lens of a video camera, or as a still video camera for TV telephone use, door phone use, surveillance use, or the like. An object of the present invention is to provide a miniaturized, bright, imaging lens having low distortion, high resolving power, and which can accommodate a wide image angle. This is achieved by using a retro focus type lens having, in order from the object side, a negative first lens group and a positive second lens group. The first lens group includes, in order from the object side: a first lens element that has positive refractive power, includes at least one aspherical surface, and is specially designed to satisfy two conditions; a second lens element that is negative; and, a third lens element that is positive.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

The imaging lens of the present invention has an arrangement, in order from the object side, of a first lens group $G_1$ that has negative refractive power and a second lens group $G_2$ that has positive refractive power. The first lens group includes, in order from the object side, a first lens element $L_1$ that has positive refractive power and at least one aspherical surface, a second lens element $L_2$ that has negative refractive power, and a third lens element $L_3$ that has positive refractive power. Furthermore, the imaging lens of the present invention is constructed to satisfy the following conditions.

$$D_2/F<0.45 \quad \text{Condition (1)}$$

$$D_4/D_T<0.1 \quad \text{Condition (2)}$$

where $D_2$ is the on-axis distance between adjacent surfaces of the first lens element and the second lens element, F is the focal distance of the imaging lens, $D_4$ is the on-axis distance between the adjacent surfaces of the second lens element and third lens element, and $D_T$ is the overall length of the imaging lens.

In addition, it is desirable for the first lens element to be composed of glass and to have a shape of either planoconvex or biconvex.

The imaging lens of the present invention achieves a compact, bright imaging lens having a high resolving power which can accommodate a wide image angle. The imaging lens maintains a sufficient back focus to allow for the insertion of other optical elements between the lens and the image plane, such as a low pass filter. In addition, desirable corrections of distortion are achieved by making the first lens element, which is positioned to receive much ambient light, a positive lens with low refractive power, and by also making at least one surface of the first lens element aspherical.

Condition (1) regulates the distance between the first lens element and second lens element versus the focal distance of the imaging lens. Desirable corrections for lateral color can be achieved by satisfying condition (1), thereby obtaining sufficient optical performance. In other words, when the value of condition (1) is surpassed, lateral color aberrations worsen considerably.

Condition (2) regulates the distance between the second lens element and the third lens element versus the overall lens length so as to obtain both a wide image angle and compactness. In other words, when the value of condition (2) is surpassed, the length of the lens becomes excessive and compactness cannot be maintained. Furthermore, by having the first lens element composed of glass and shaped either planoconvex or biconvex, the lens element can be easily manufactured.

Various embodiments of the invention will now be described in detail.

EMBODIMENT 1

Figure 1:
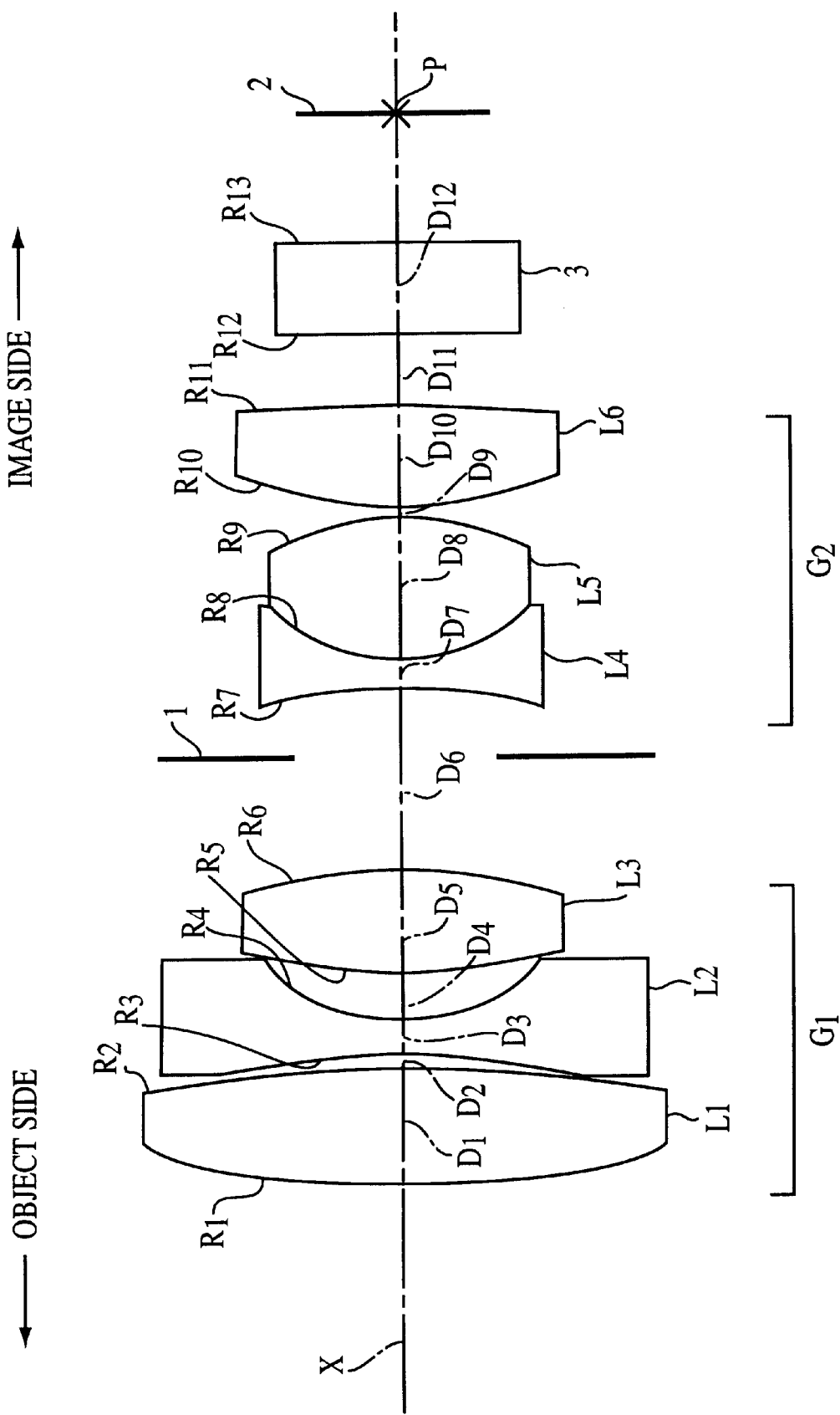
FIG. 1 illustrates the basic lens structure of Embodiment 1.

FIG. 1 shows the basic lens structure for Embodiment 1 of this invention. The imaging lens has an arrangement, in order from the object side, of a negative first lens group $G_1$ and a positive second lens group $G_2$. In the first lens group $G_1$, the lens element surface on the extreme object side is planar in the vicinity of the optical axis X. This lens group includes, in order from the object side, a first lens element $L_1$ which is a planoconvex lens, a second lens element $L_2$ which is a biconcave lens, and a third lens element $L_3$ which is a biconvex lens. Moreover, the first lens element $L_1$ is composed of glass.

The second lens group $G_2$ includes, in order from the object side, a fourth lens element $L_4$ which is a biconcave lens, a fifth lens element $L_5$ which is a biconvex lens, and a sixth lens element $L_6$ which is a biconvex lens. Moreover, the fourth lens element $L_4$ and the fifth lens element $L_5$ are cemented together. In addition, a diaphragm 1 is arranged between the third lens element $L_3$ and the fourth lens element $L_4$, and a low-pass filter 3 is arranged between the sixth lens element $L_6$ and the light receiving surface 2 of the solid-state image sensor. Thus, the optical flux that is incident onto the object side of the imaging lens is formed into an image at position P of the light receiving surface 2 of the solid-state image sensor.

Table 1 below lists the surface number #, in order from the object side, the radius of curvature R (in mm) of each lens element surface near the optical axis, the on-axis spacing D (in mm) between each lens element surface, as well as the index of refraction $N_d$ and the Abbe number $V_d$ at the sodium d line of each lens element of Embodiment 1. Also, the focal distance F, the back focus Bf, the f-number $F_{NO}$, and the half-image angle ω (i.e., one-half the field of view), as well as the values of $D_2/F$ and $D_4/D_T$ of the imaging lens of this embodiment are listed in the lower part of Table 1.

TABLE 1

| # | R | D | $N_d$ | $V_d$ |
|---|---|---|---|---|
| 1* | ∞ | 3.0 | 1.69660 | 53.1 |
| 2* | −26.240 | 0.2 | | |
| 3 | −25.771 | 0.9 | 1.77621 | 49.4 |
| 4 | 4.521 | 1.2 | | |
| 5 | 14.142 | 2.6 | 1.85504 | 23.6 |
| 6 | −14.552 | 4.8 | | |
| 7 | −15.033 | 0.7 | 1.85504 | 23.6 |
| 8 | 4.738 | 3.6 | 1.71615 | 53.7 |
| 9 | −6.163 | 0.2 | | |
| 10 | 10.180 | 2.5 | 1.83962 | 42.8 |
| 11 | −102.999 | 2.0 | | |
| 12 | ∞ | 2.3 | 1.51825 | 63.8 |
| 13 | ∞ | | | |

F = 4.52 mm
Bf = 6.81 mm
$F_{NO}$ = 2.0
ω = 34.6°
$D_2/F$ = 0.04
$D_4/D_T$ = 0.06

Those surfaces with a * to the right of the surface number in Table 1 are aspherical surfaces, and the aspherical surface shape is expressed by Equation (A) below.

$$Z=Ch^2/\{1+(1-KC^2h^2)^{1/2}\}+A_4h^4+A_6h^6+A_8h^8+A_{10}h^{10} \quad \text{(Equation A)}$$

where

Z is the length (in mm) of a line drawn from a point on the aspherical surface at height h from the optical axis to the tangential plane of the aspherical surface vertex, C (=1/R) is the curvature of the aspherical surface near the optical axis, h is the height (in mm) from the optical axis, K is the eccentricity, and $A_4$, $A_6$, $A_8$, and $A_{10}$ are the 4th, 6th, 8th, and 10th aspherical coefficients.

The values of each of the constants K and $A_4$–$A_{10}$ of the aspherical surfaces indicated in Table 1 are shown in Table 2.

TABLE 2

| # | K | $A_4$ | $A_6$ | $A_8$ | $A_{10}$ |
|---|---|---|---|---|---|
| 1 | 1.0 | 0.7601767 × 10$^{-3}$ | −0.8094318 × 10$^{-5}$ | 0.4087838 × 10$^{-7}$ | 0.8548601 × 10$^{-9}$ |
| 2 | 1.0 | 0.1006182 × 10$^{-2}$ | −0.3737725 × 10$^{-4}$ | 0.5021990 × 10$^{-6}$ | −0.2554661 × 10$^{-8}$ |

Moreover as shown in the lower section of Table 1, the focal distance of the imaging lens is 4.52 mm, the back focus is 6.81 mm, the f-number is 2.0, and the half-image angle is 34.6°. In addition, the value of $D_2/F$ is 0.04, and the value of $D_4/D_T$ is 0.06, which satisfy the above conditions (1) and (2).

EMBODIMENT 2

Figure 2:
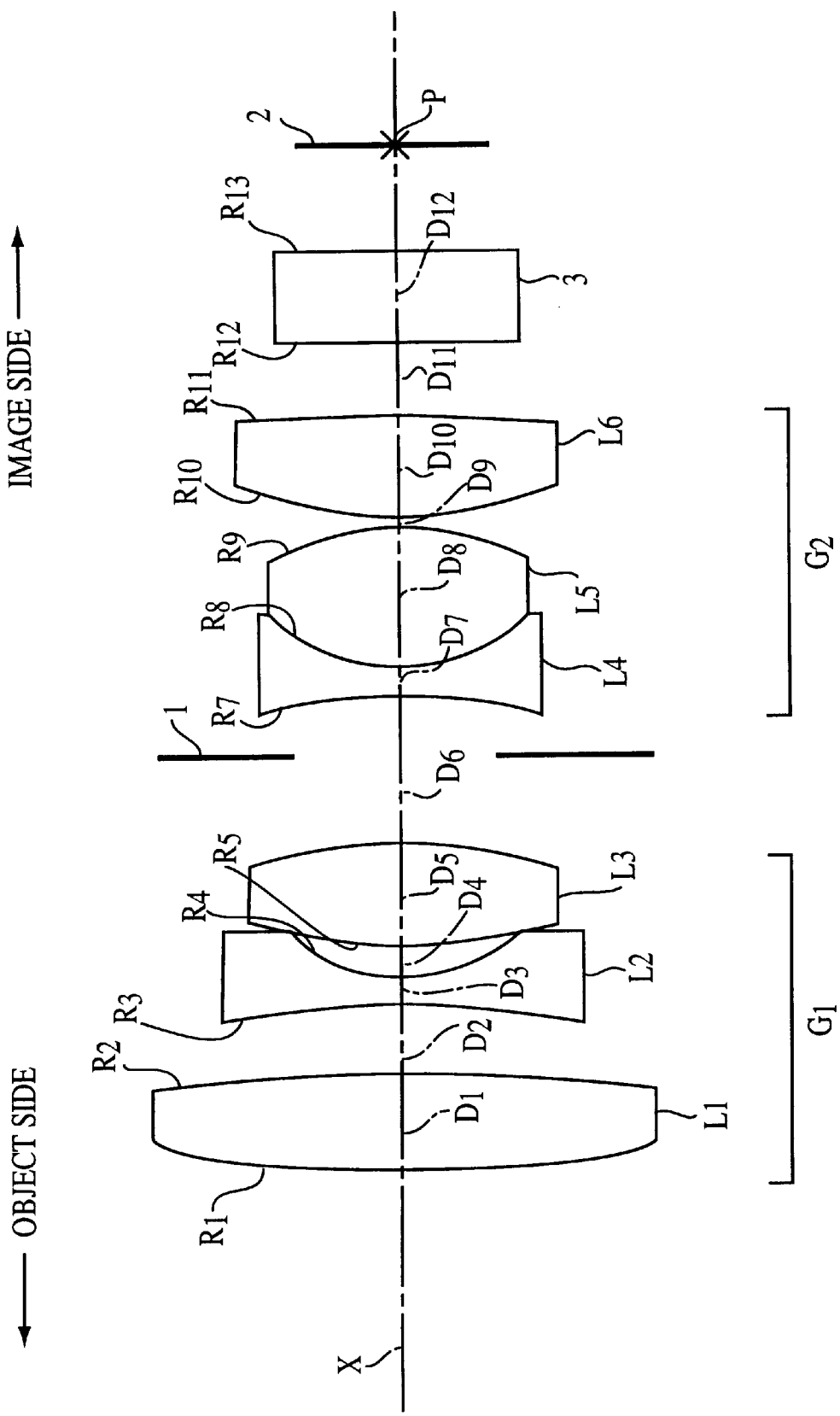
FIG. 2 illustrates the basic lens structure of Embodiments 2 and 3.

FIG. 2 shows the basic lens structure for Embodiment 2 of the invention. The imaging lens of Embodiment 2, as shown in FIG. 2, is structured to be similar to that of Embodiment 1, but differs in that the space $D_2$ between the first lens element $L_1$ and second lens element $L_2$ is made to be comparatively larger.

Table 3 below lists the surface number #, in order from the object side, the radius of curvature R (in mm) of each lens element surface near the optical axis, the on-axis spacing D (in mm) between each lens element surface, as well as the index of refraction $N_d$ and the Abbe number $V_d$ at the sodium d line of each lens element of Embodiment 2. Also, the focal distance F, the back focus Bf, the f-number $F_{NO}$, and the half-image angle ω, as well as the values of $D_2/F$ and $D_4/D_T$ of the imaging lens of this embodiment are listed in the lower part of Table 3.

TABLE 3

| # | R | D | $N_d$ | $V_d$ |
|---|---|---|---|---|
| 1* | ∞ | 2.5 | 1.69660 | 53.1 |
| 2* | −27.695 | 1.2 | | |
| 3 | −24.797 | 0.7 | 1.74690 | 49.0 |
| 4 | 4.500 | 1.0 | | |
| 5 | 15.104 | 2.5 | 1.85504 | 23.6 |
| 6 | −13.937 | 4.4 | | |
| 7 | −14.063 | 0.7 | 1.85504 | 23.6 |
| 8 | 4.685 | 3.4 | 1.73742 | 50.8 |
| 9 | −6.088 | 0.2 | | |
| 10 | 9.731 | 2.5 | 1.83929 | 37.1 |
| 11 | −88.565 | 2.0 | | |
| 12 | ∞ | 2.3 | 1.51825 | 63.8 |
| 13 | ∞ | | | |

F = 4.52 mm
Bf = 6.33 mm
$F_{NO}$ = 2.0
ω = 34.6°
$D_2/F$ = 0.27
$D_4/D_T$ = 0.05

Those surfaces with a * to the right of the surface number in Table 3, above, are aspherical surfaces, and the aspherical surface shape is expressed by Equation (A) above. The values of each of the constants K and $A_4$–$A_{10}$ of the aspherical surfaces are shown in Table 4.

TABLE 4

| # | K | $A_4$ | $A_6$ | $A_8$ | $A_{10}$ |
|---|---|---|---|---|---|
| 1 | 1.0 | $0.6459501 \times 10^{-3}$ | $-0.8467281 \times 10^{-5}$ | $0.4608747 \times 10^{-8}$ | $0.5497376 \times 10^{-9}$ |
| 2 | 1.0 | $0.9173679 \times 10^{-3}$ | $-0.3583341 \times 10^{-4}$ | $0.64122506 \times 10^{-6}$ | $-0.4439290 \times 10^{-8}$ |

Moreover, in this Embodiment 2, as shown in the lower section of Table 3, the focal distance of the imaging lens is 4.52 mm, the back focus is 6.33 mm, the f-number is 2.0, and the half-image angle is 34.6°. In addition, the value of $D_2/F$ is 0.27, and the value of $D_4/D_T$ is 0.05, which satisfy the above conditions (1) and (2).

EMBODIMENT 3

The basic lens structure of Embodiment 3 is similar to that of Embodiment 2, and is thus also illustrated by FIG. 2.

Table 5 below lists the surface number #, in order from the object side, the radius of curvature R (in mm) of each lens element surface near the optical axis, the on-axis spacing D (in mm) between each lens element surface, as well as the index of refraction $N_d$ and the Abbe number $V_d$ at the sodium d line of each lens element of Embodiment 3. Also, the focal distance F, the back focus Bf, the f-number $F_{NO}$, and the half-image angle ω, as well as the values of $D_2/F$ and $D_4/D_T$ of the imaging lens of this embodiment are listed in the lower part of Table 5.

TABLE 5

| # | R | D | $N_d$ | $V_d$ |
|---|---|---|---|---|
| 1* | ∞ | 2.5 | 1.69660 | 53.1 |
| 2* | −26.260 | 1.7 | | |
| 3 | −24.898 | 0.7 | 1.80831 | 46.3 |
| 4 | 4.500 | 0.9 | | |
| 5 | 14.613 | 2.5 | 1.85504 | 23.6 |
| 6 | −12.990 | 4.0 | | |
| 7 | −13.871 | 0.7 | 1.85504 | 23.6 |
| 8 | 4.664 | 3.4 | 1.74690 | 49.0 |
| 9 | −6.015 | 0.2 | | |
| 10 | 9.852 | 2.5 | 1.83929 | 37.1 |
| 11 | −102.548 | 2.0 | | |
| 12 | ∞ | 2.3 | 1.51825 | 63.8 |
| 13 | ∞ | | | |

F = 4.53 mm
Bf = 6.35 mm
$F_{NO}$ = 2.4
ω = 34.4°
$D_2/F$ = 0.38
$D_4/D_T$ = 0.05

Those surfaces with a * to the right of the surface number in Table 5, above, are aspherical surfaces, and the aspherical surface shape is expressed by Equation (A) above. The values of each of the constants and $A_4$–$A_{10}$ of the aspherical surfaces are shown in Table 6.

TABLE 6

| # | K | $A_4$ | $A_6$ | $A_8$ | $A_{10}$ |
|---|---|---|---|---|---|
| 1 | 1.0 | $0.6013255 \times 10^{-3}$ | $-0.9183930 \times 10^{-5}$ | $0.4177927 \times 10^{-8}$ | $0.2850887 \times 10^{-9}$ |
| 2 | 1.0 | $0.8922627 \times 10^{-3}$ | $-0.33299320 \times 10^{-4}$ | $0.6182676 \times 10^{-6}$ | $-0.4466510 \times 10^{-8}$ |

Moreover, in this Embodiment 3, as shown in the lower section of Table 5, the focal distance of the imaging lens is 4.53 mm, the back focus is 6.35 mm, the f-number is 2.4, and the half-image angle is 34.4°. In addition, the value of $D_2/F$ is 0.38, and the value of $D_4/D_T$ is 0.05, above conditions (1) and (2).

EMBODIMENT 4

Figure 3:
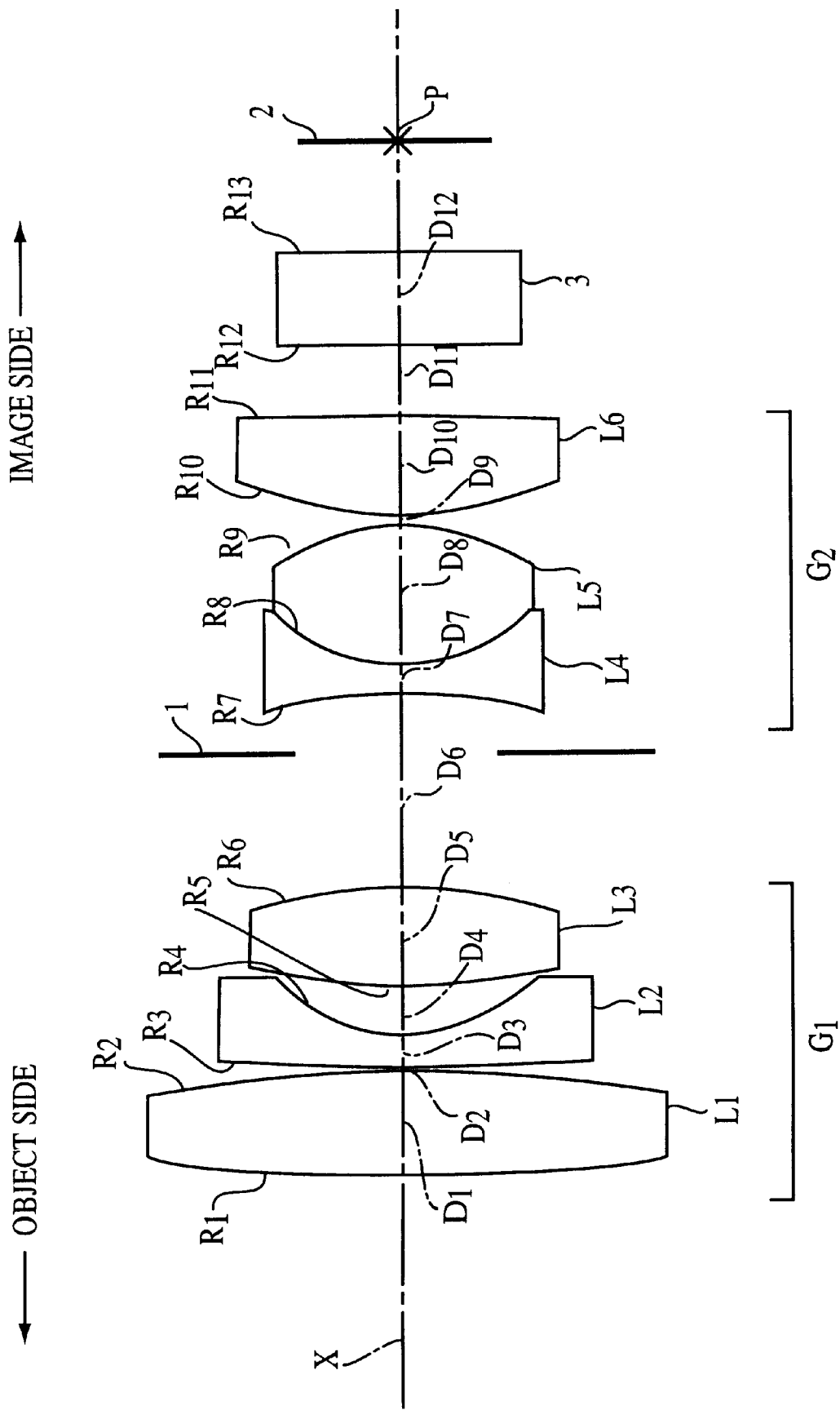
FIG. 3 illustrates the basic lens structure of Embodiment 4.
Figure 4:
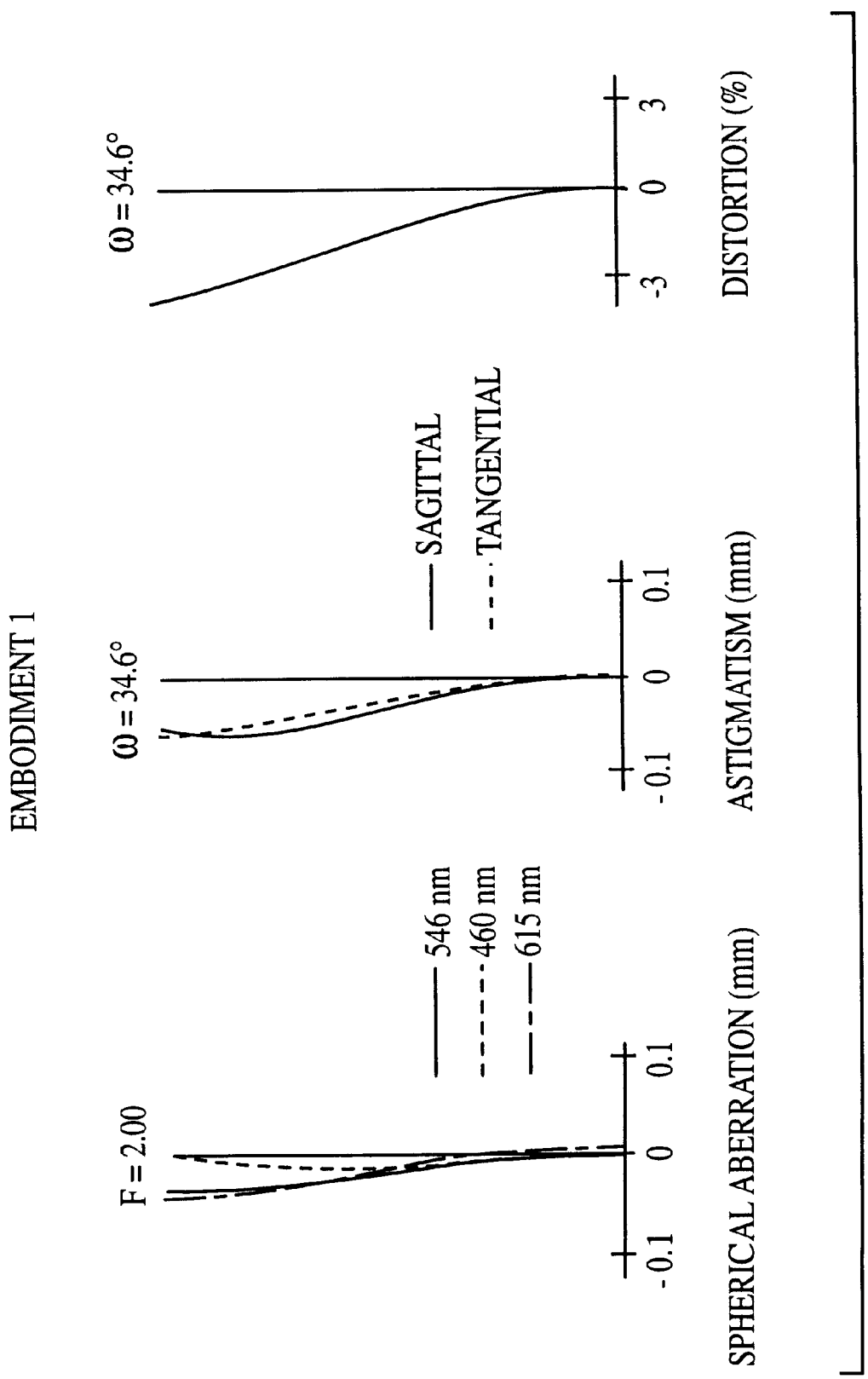
FIG. 4 illustrates the spherical aberration, astigmatism (sagittal and tangential), and distortion of the lens of Embodiment 1.
Figure 5:
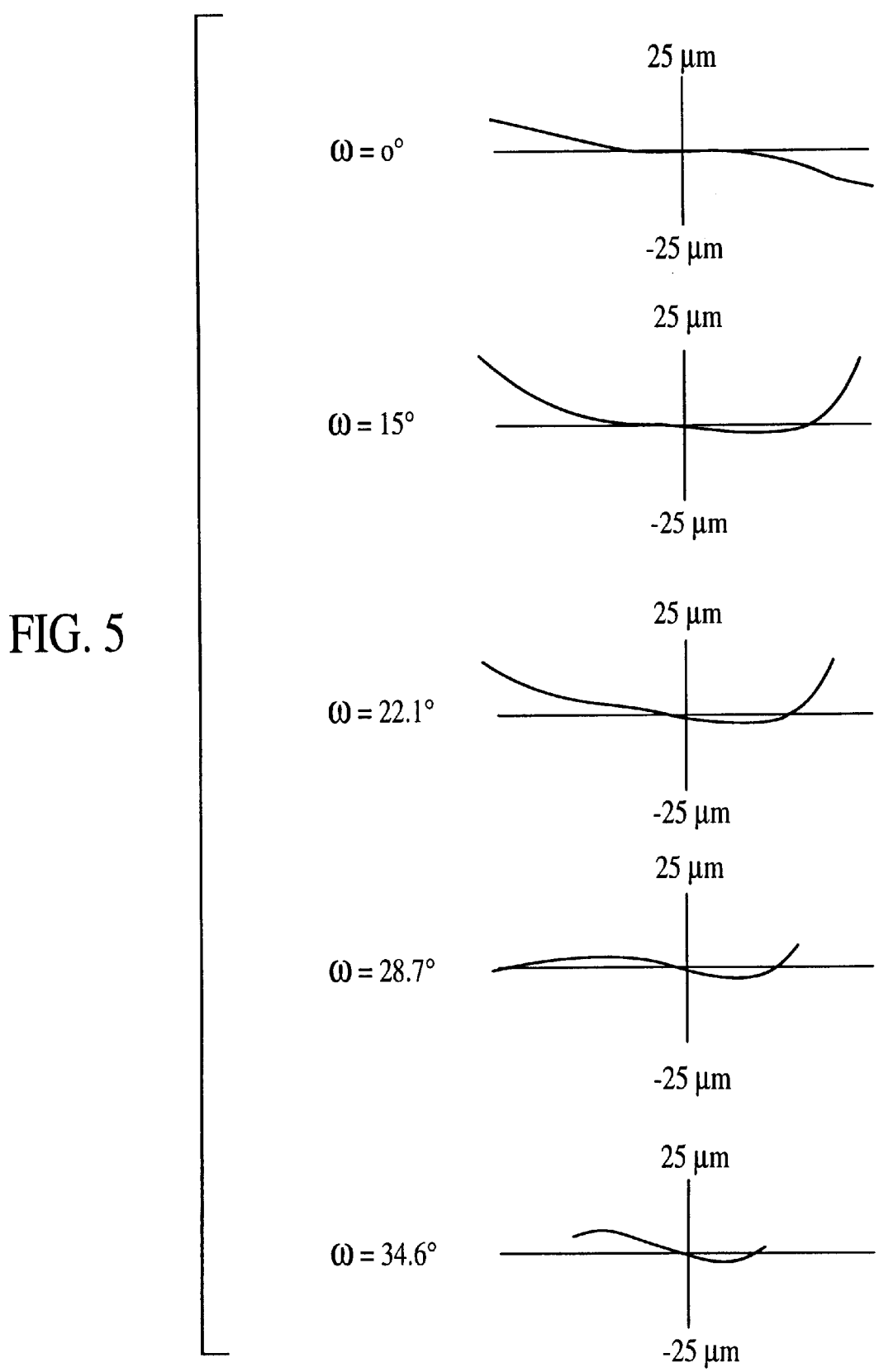
FIG. 5 illustrates the coma of the lens of Embodiment 1.
Figure 6:
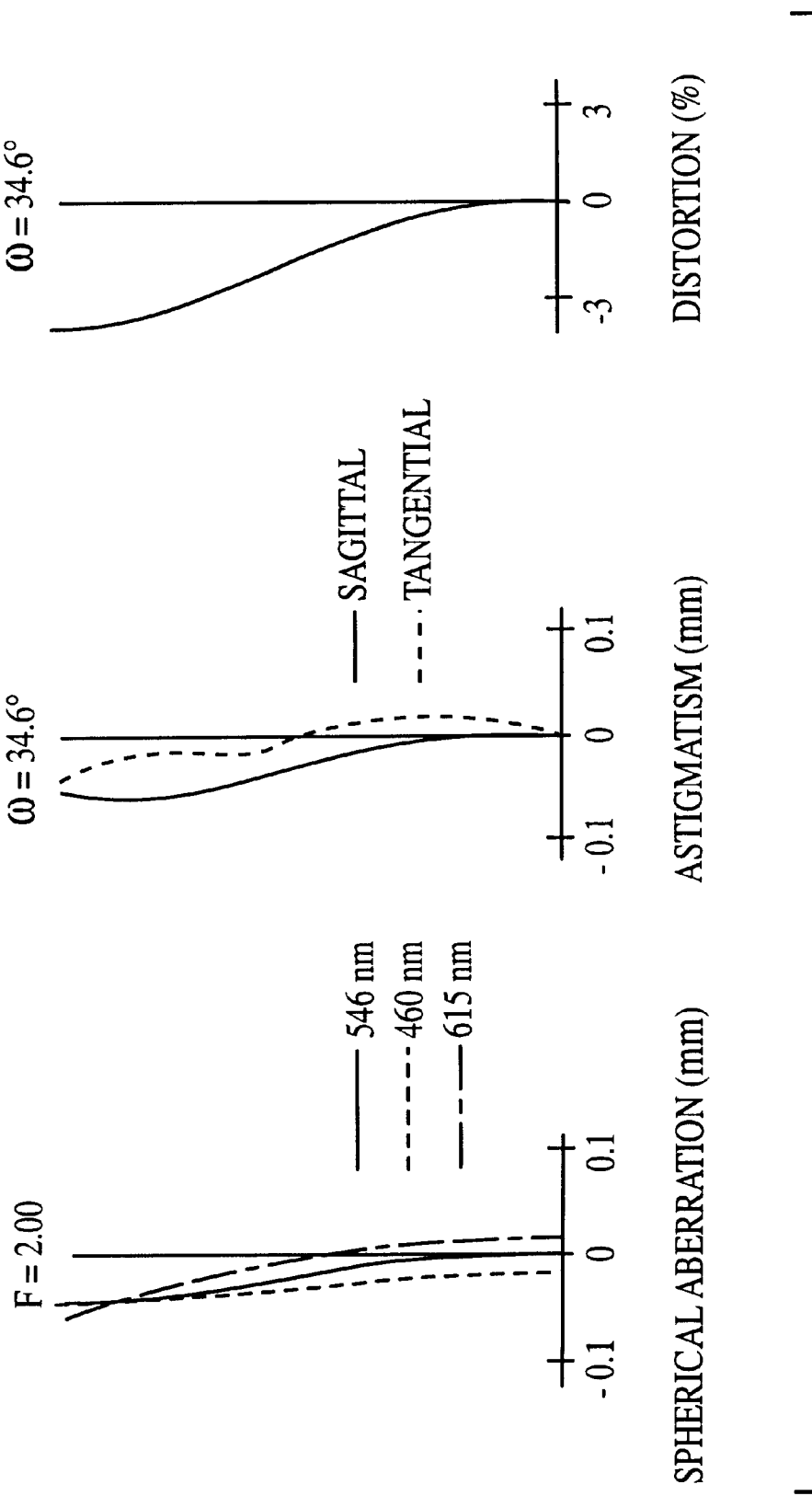
FIG. 6 illustrates the spherical aberration, astigmatism (sagittal and tangential), and distortion of the lens of Embodiment 2.
Figure 7:
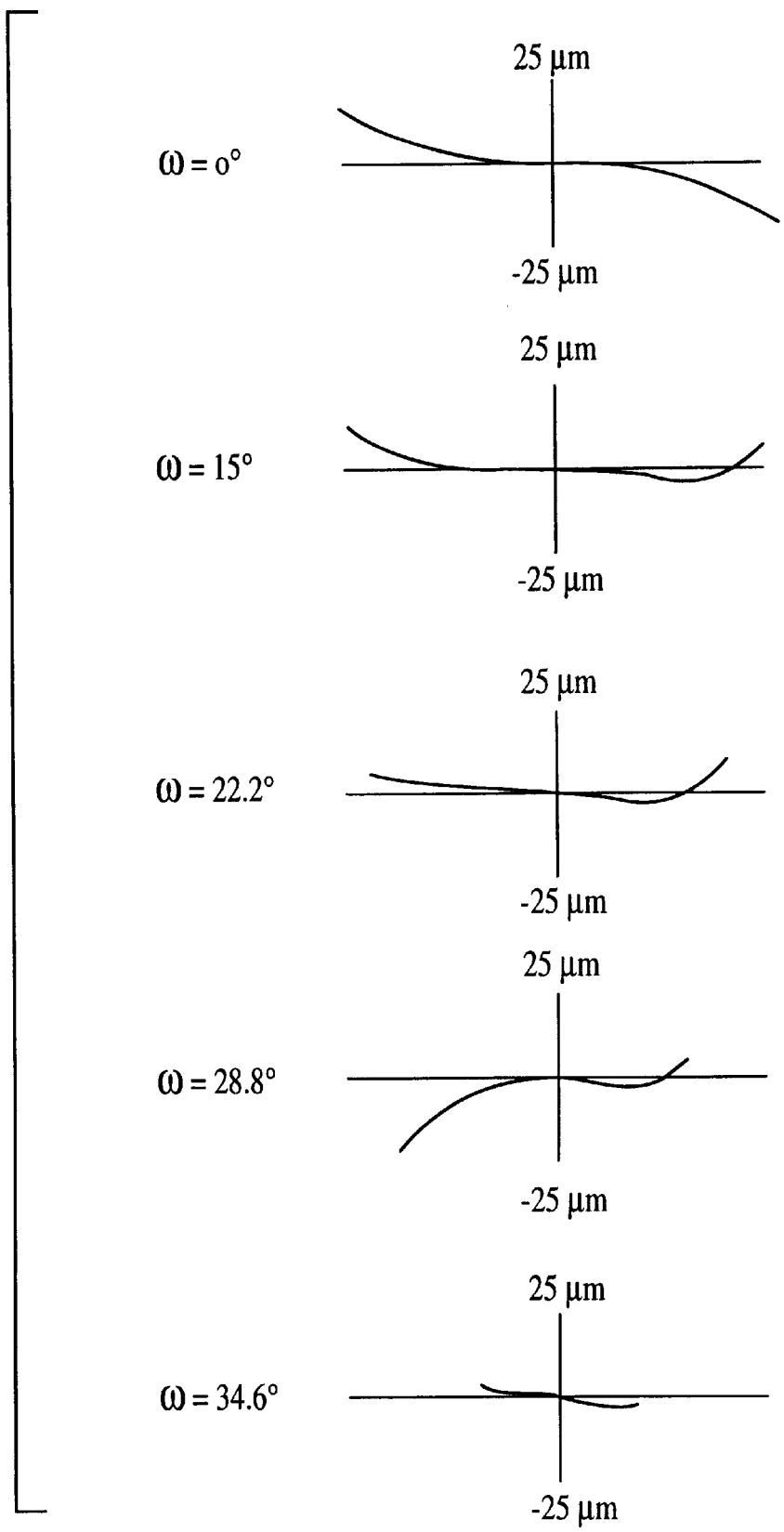
FIG. 7 illustrates the coma of the lens of Embodiment 2.
Figure 8:
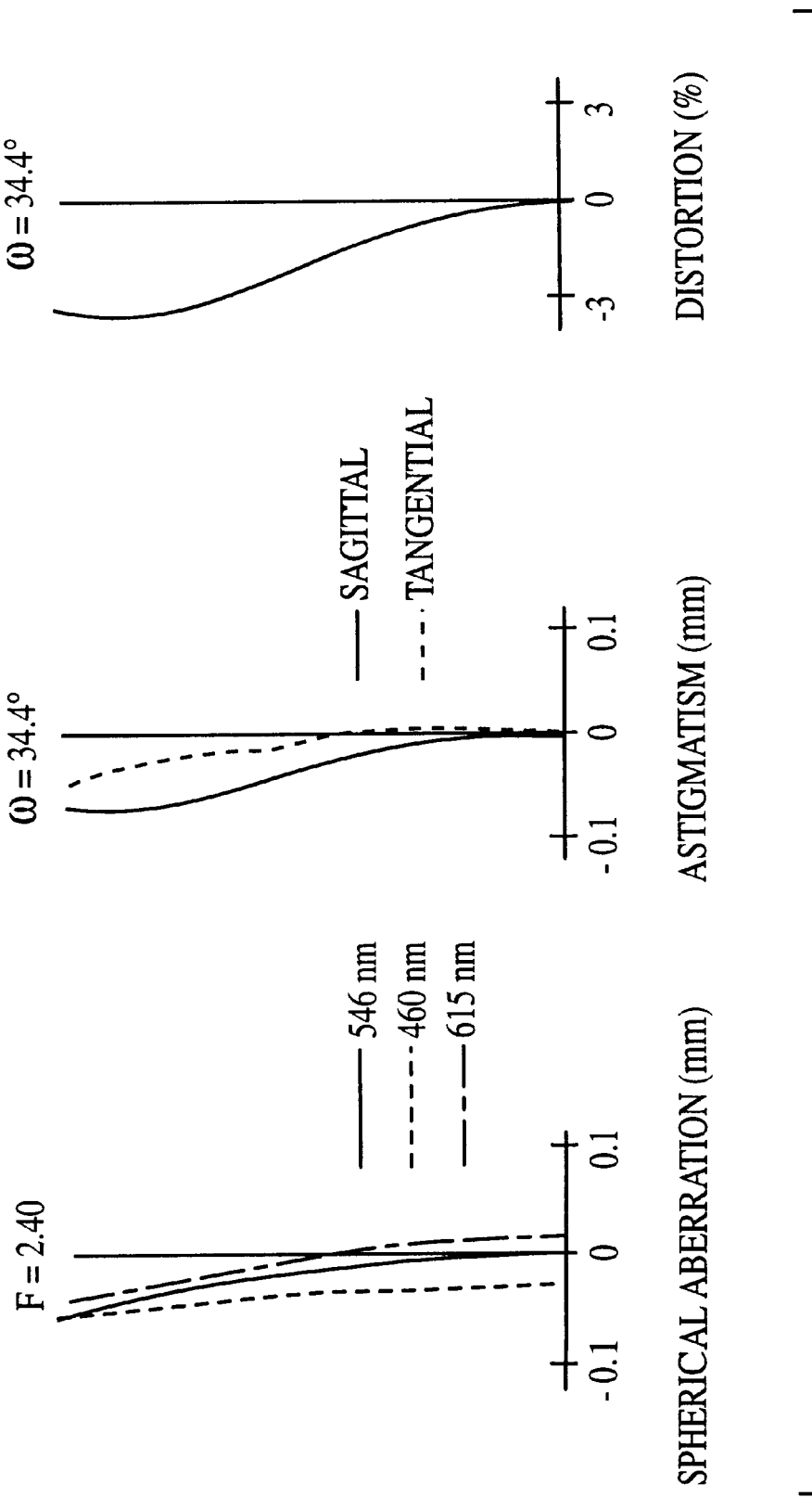
FIG. 8 illustrates the spherical aberration, astigmatism (sagittal and tangential), and distortion of the lens of Embodiment 3.
Figure 9:
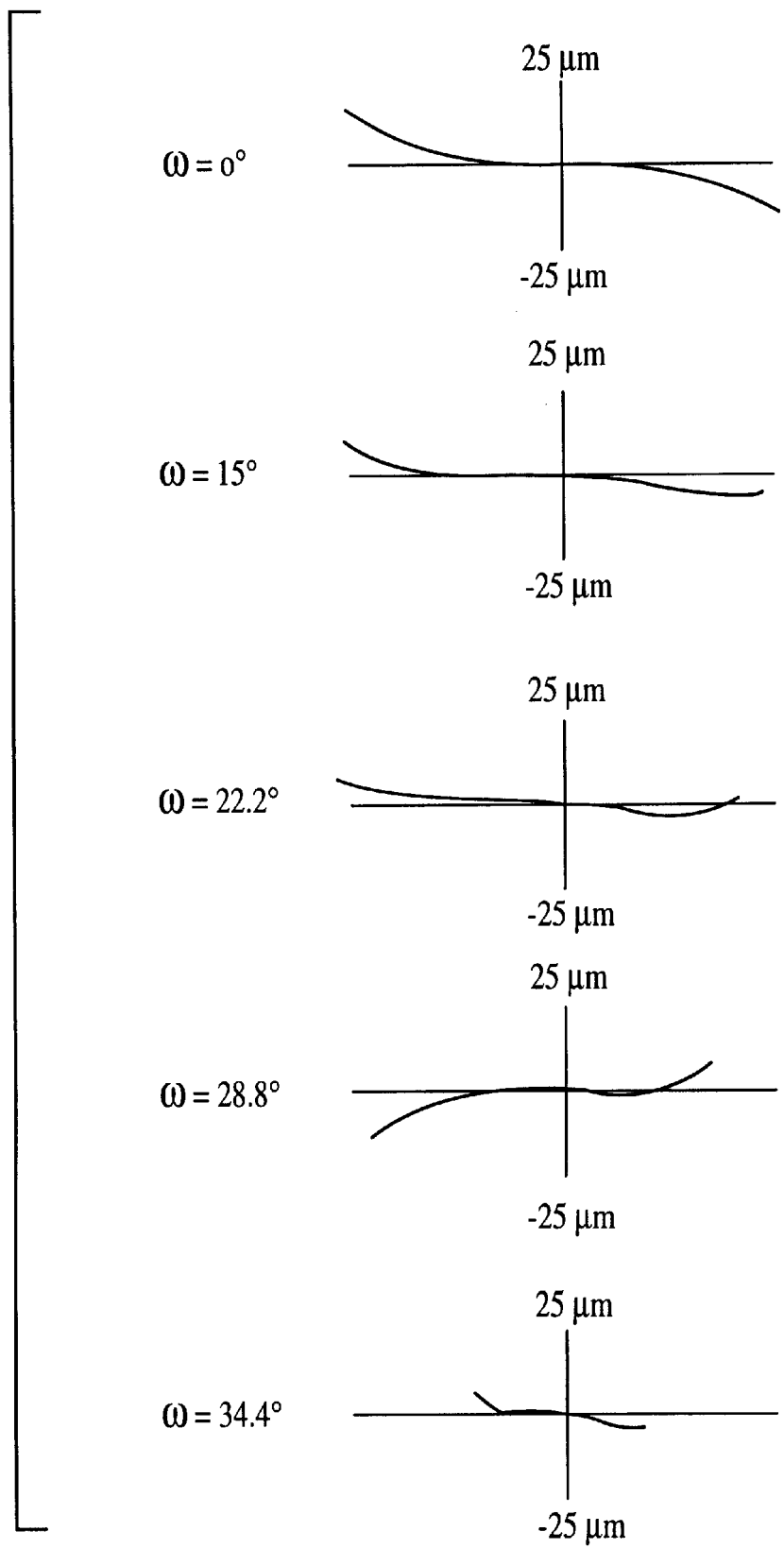
FIG. 9 illustrates the coma of the lens of Embodiment 3.
Figure 10:
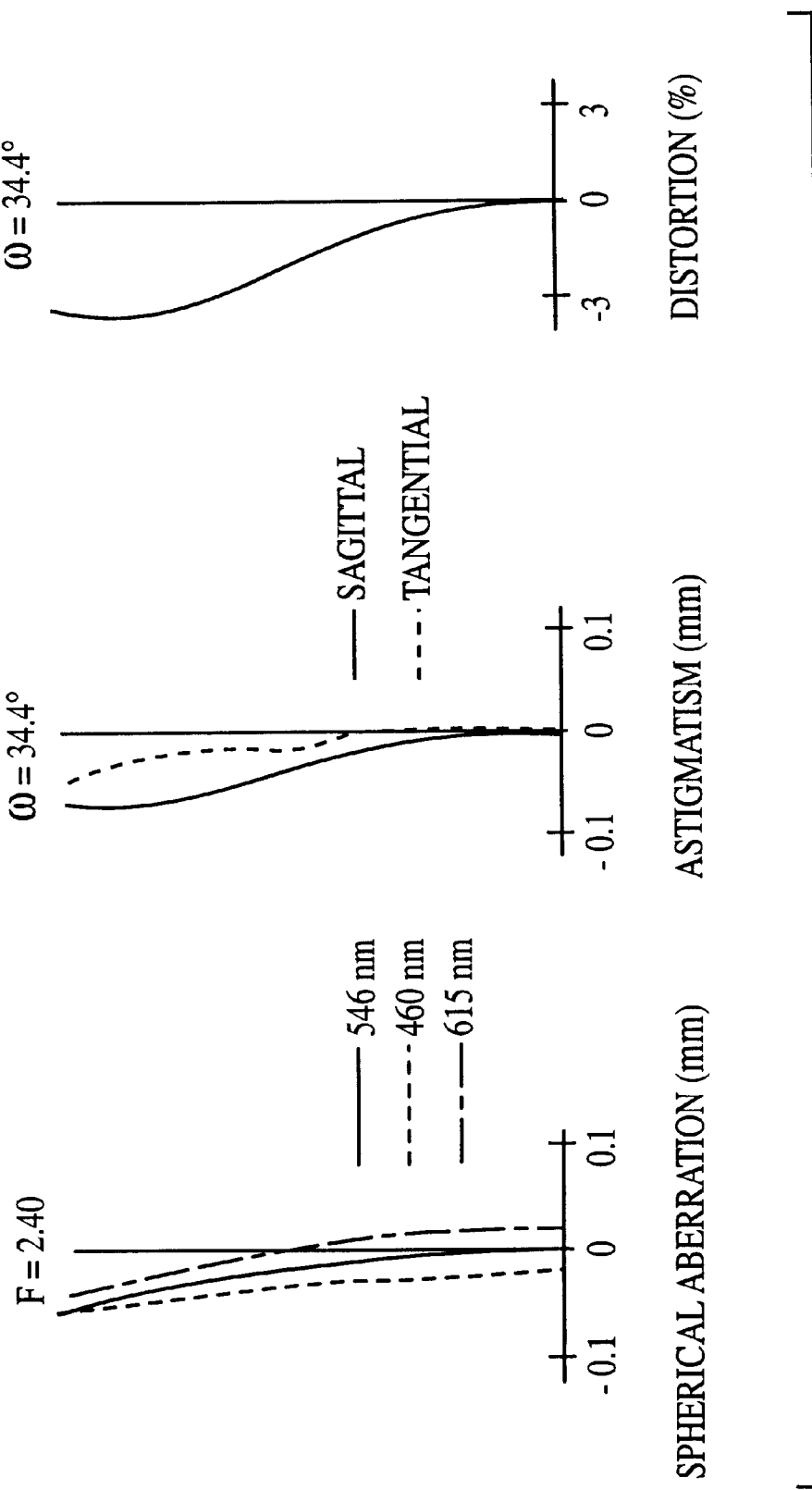
FIG. 10 illustrates the spherical aberration, astigmatism (sagittal and tangential), and distortion of the lens of Embodiment 4.
Figure 11:
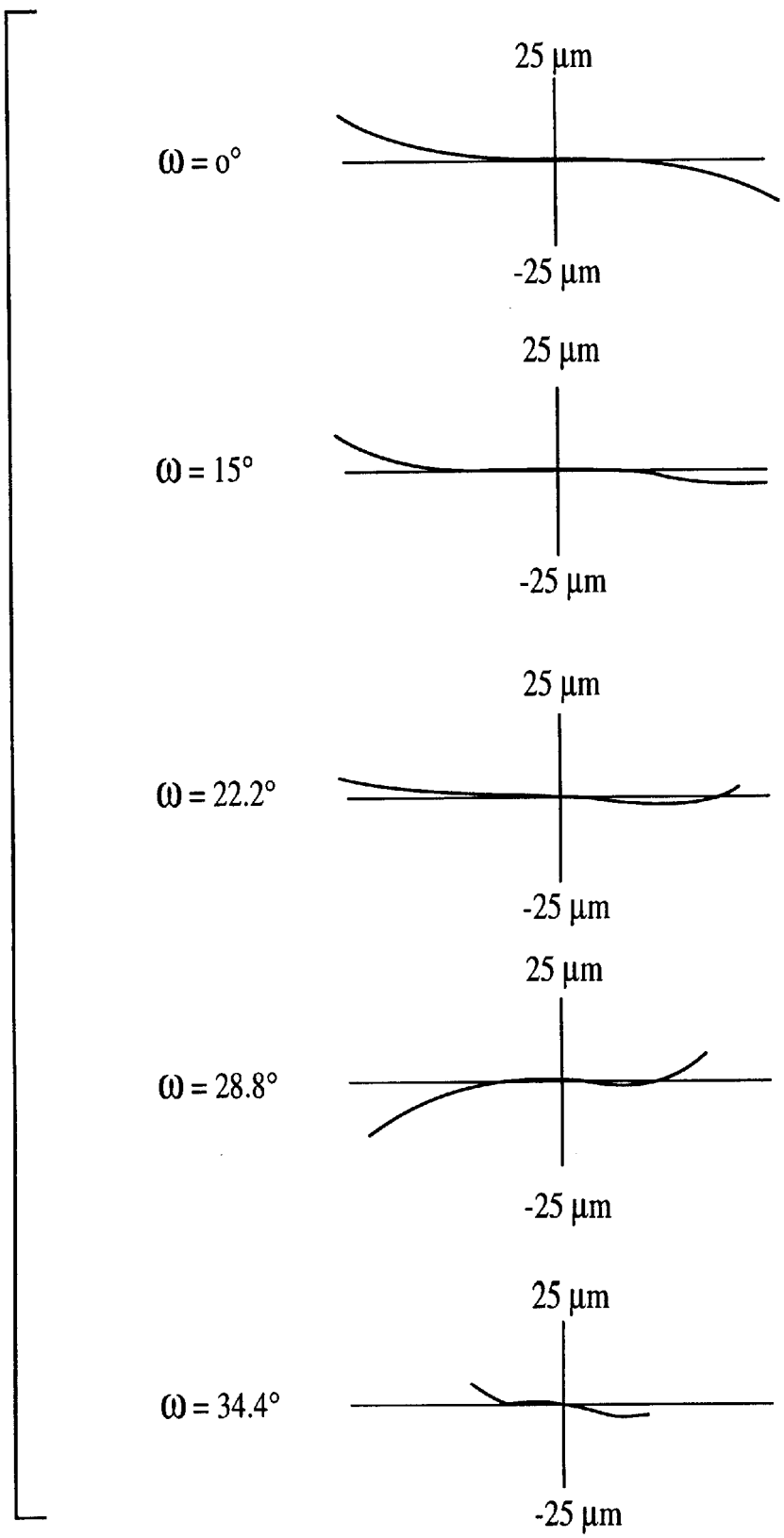
FIG. 11 illustrates the coma of the lens of Embodiment 4.
Figure 12:
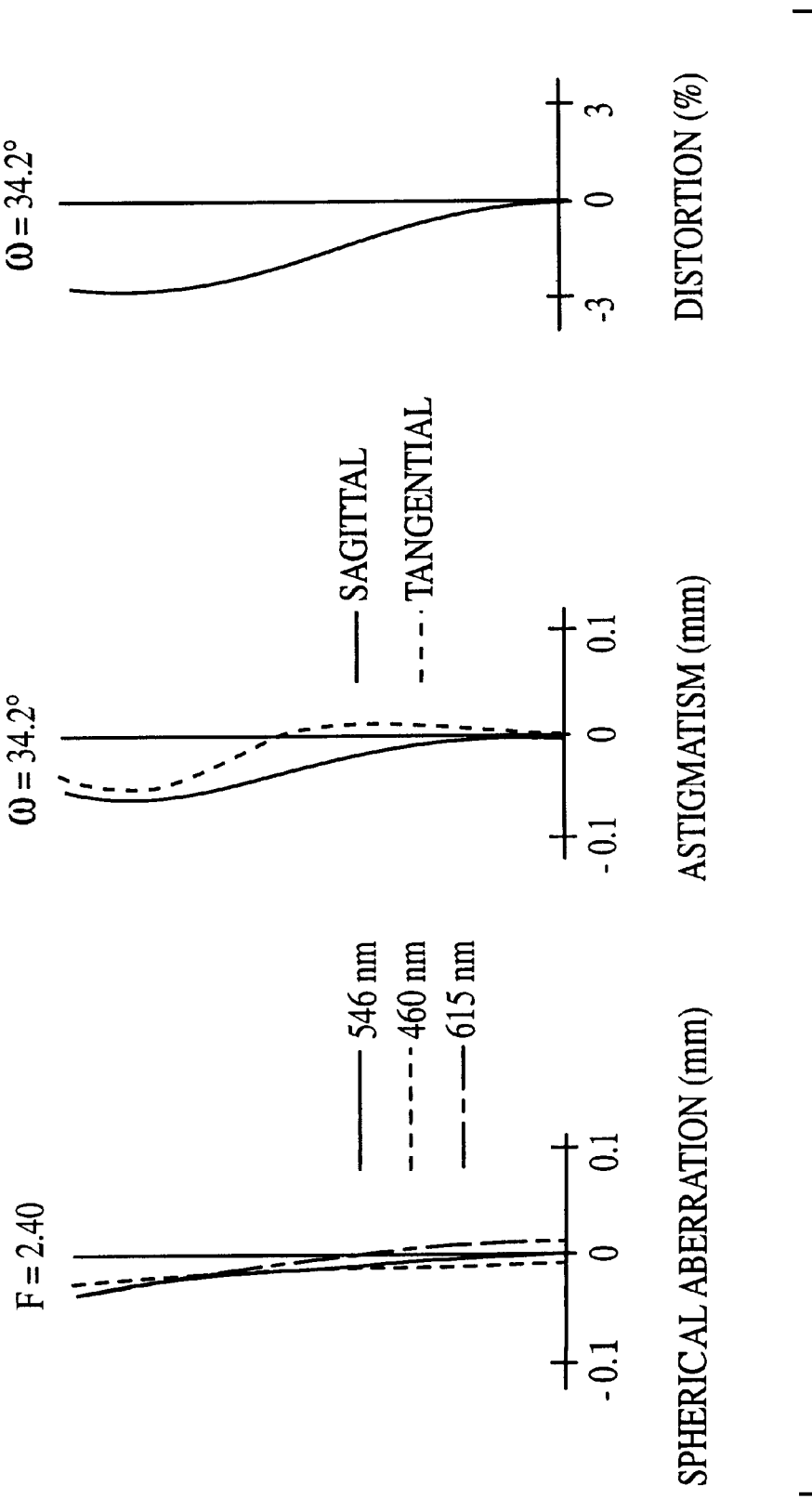
FIG. 12 illustrates the spherical aberration, astigmatism (sagittal and tangential), and distortion of the lens of Embodiment 5.
Figure 13:
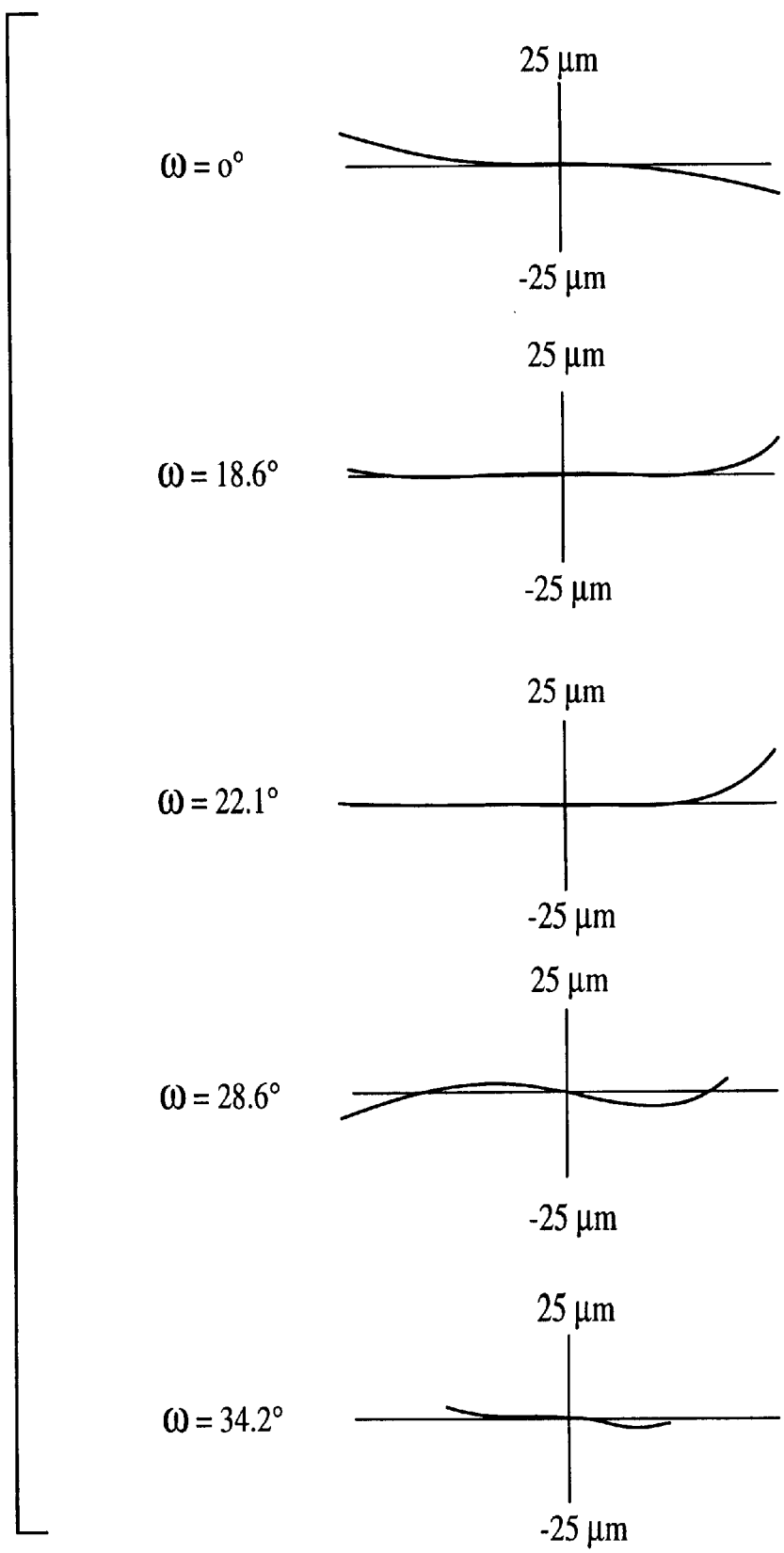
FIG. 13 illustrates the coma of the lens of Embodiment 5.
Figure 14:
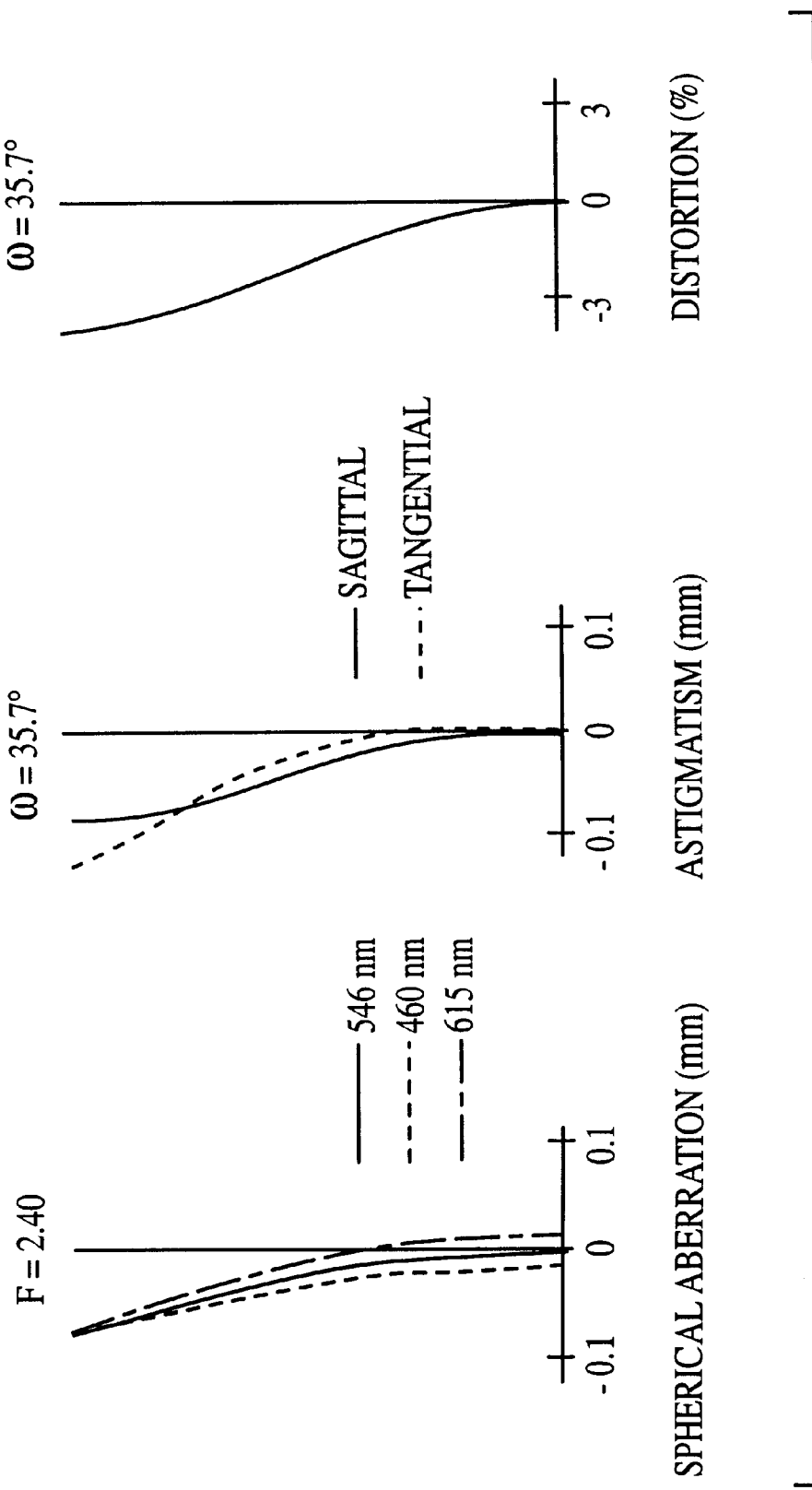
FIG. 14 illustrates the spherical aberration, astigmatism (sagittal and tangential), and distortion of the lens of Embodiment 6.
Figure 15:
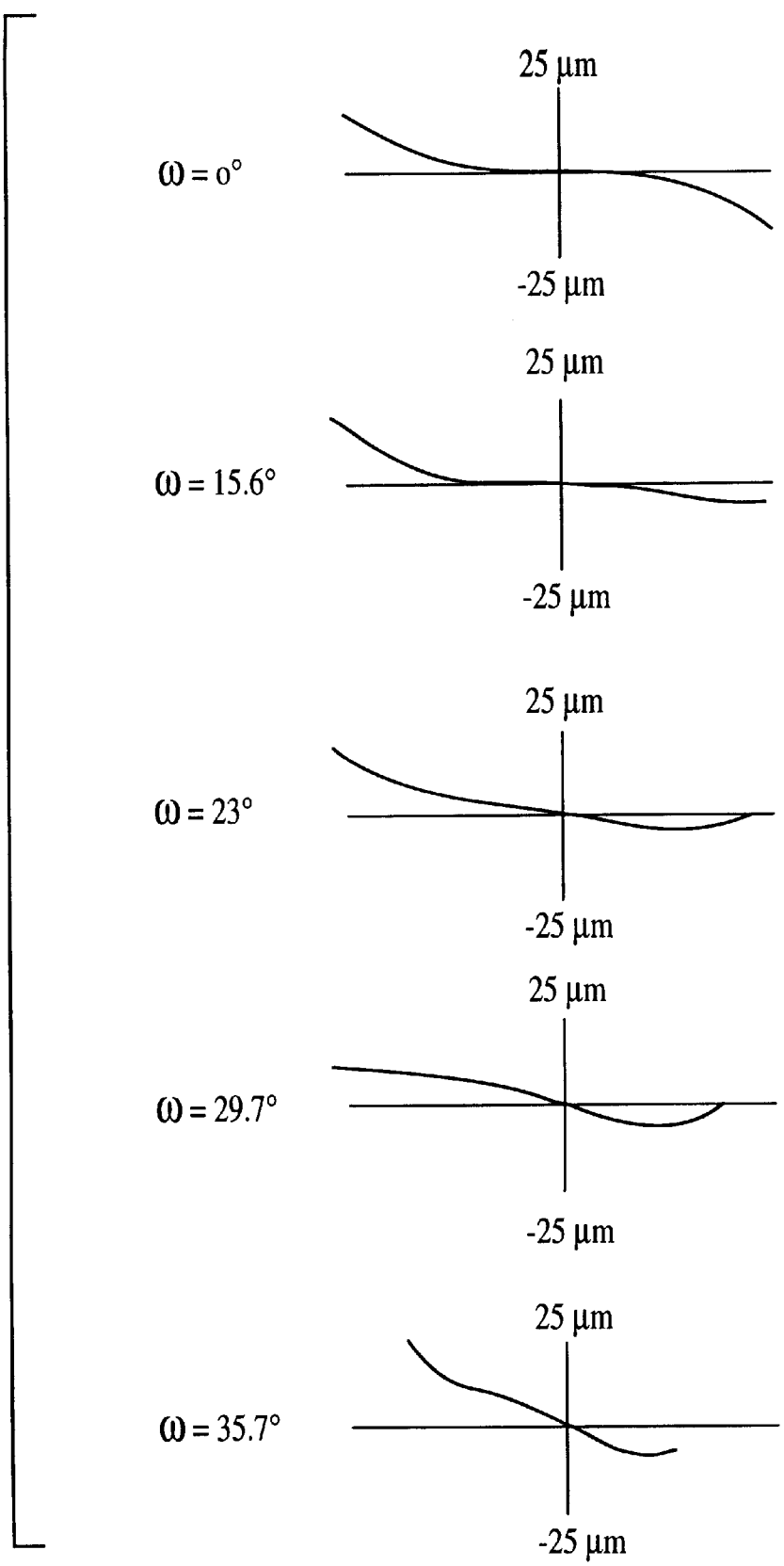
FIG. 15 illustrates the coma of the lens of Embodiment 6.

FIG. 3 shows the basic lens structure of Embodiment 4, which is similar to that of Embodiment 1 but differs in that the second lens element $L_2$ is a negative meniscus lens with its convex surface on the object side.

Table 7 below lists the surface number #, in order from the object side, the radius of curvature R (in mm) of each lens element surface near the optical axis, the on-axis spacing D (in mm) between each lens element surface, as well as the index of refraction $N_d$ and the Abbe number $V_d$ at the sodium d line of each lens element of Embodiment 4. Also, the focal distance F, the back focus Bf, the f-number $F_{NO}$, and the half-image angle ω, as well as the values of $D_2/F$ and $D_4/D_T$ of the imaging lens of this embodiment are listed in the lower part of Table 7.

TABLE 7

| # | R | D | $N_d$ | $V_d$ |
|---|---|---|---|---|
| 1* | ∞ | 2.5 | 1.77621 | 49.4 |
| 2* | −38.497 | 0.2 | | |
| 3 | 30.000 | 0.7 | 1.83962 | 42.8 |
| 4 | 4.500 | 1.3 | | |
| 5 | 18.069 | 2.5 | 1.85504 | 23.6 |
| 6 | −17.387 | 5.2 | | |
| 7 | −13.225 | 0.7 | 1.85504 | 23.6 |
| 8 | 4.600 | 3.4 | 1.73234 | 54.4 |
| 9 | −6.028 | 0.2 | | |
| 10 | 9.285 | 2.5 | 1.83962 | 42.8 |
| 11 | −116.815 | 2.0 | | |
| 12 | ∞ | 2.3 | 1.51825 | 63.8 |
| 13 | ∞ | | | |

F = 4.52 mm
Bf = 6.22 mm
$F_{NO}$ = 2.4
ω = 34.4°
$D_2/F$ = 0.04
$D_4/D_T$ = 0.07

Those surfaces with a * to the right of the surface number in Table 7, above, are aspherical surfaces, and the aspherical surface shape is expressed by Equation (A) above. The values of each of the constants K and $A_4$–$A_{10}$ of the aspherical surfaces are shown in Table 8.

TABLE 8

| # | K | $A_4$ | $A_6$ | $A_8$ | $A_{10}$ |
|---|---|---|---|---|---|
| 1 | 1.0 | 0.5960671 × 10$^{-3}$ | −0.8640657 × 10$^{-5}$ | −0.8625086 × 10$^{-7}$ | 0.1619306 × 10$^{-8}$ |
| 2 | 1.0 | 0.9143308 × 10$^{-3}$ | −0.4143910 × 10$^{-4}$ | 0.6910621 × 10$^{-6}$ | −0.4236005 × 10$^{-8}$ |

Moreover, in this Embodiment 4, as shown in the lower section of Table 7, the focal distance of the imaging lens is 4.52 mm, the back focus is 6.22 mm, the f-number is 2.4, and the half-image angle is 34.4°. In addition, the value of $D_2/F$ is 0.04, and the value of $D_4/D_T$ is 0.07, which satisfy the above conditions (1) and (2).

EMBODIMENT 5

The imaging lens of Embodiment 5, as shown in FIG. 1, is structured to be similar to the imaging lens of Embodiment 1, but differs in that the first lens element $L_1$ is a biconvex plastic lens. By making the first lens element $L_1$ to be a biconvex plastic lens, manufacturing costs can be further reduced.

Table 9 below lists the surface number #, in order from the object side, the radius of curvature R (in mm) of each lens element surface near the optical axis, the on-axis spacing D (in mm) between each lens element surface, as well as the index of refraction $N_d$ and the Abbe number $V_d$ at the sodium d line of each lens element of Embodiment 5. Also, the focal distance F, the back focus Bf, the f-number $F_{NO}$, and the half-image angle ω, as well as the values of $D_2/F$ and $D_4/D_T$ of the imaging lens of this embodiment are listed in the lower part of Table 9.

TABLE 9

| # | R | D | $N_d$ | $V_d$ |
|---|---|---|---|---|
| 1* | 412.575 | 3.1 | 1.49217 | 57.3 |
| 2* | −24.916 | 0.2 | | |
| 3 | −25.106 | 0.7 | 1.71615 | 53.7 |
| 4 | 4.500 | 1.1 | | |
| 5 | 14.011 | 2.5 | 1.85504 | 23.6 |
| 6 | −14.811 | 5.0 | | |
| 7 | −15.111 | 0.7 | 1.85504 | 23.6 |
| 8 | 4.731 | 3.6 | 1.71615 | 53.7 |
| 9 | −6.126 | 0.2 | | |
| 10 | 9.873 | 2.5 | 1.83962 | 42.8 |
| 11 | −89.575 | 2.0 | | |
| 12 | ∞ | 2.3 | 1.51825 | 63.8 |
| 13 | ∞ | | | |

F = 4.52 mm
Bf = 6.47 mm
$F_{NO}$ = 2.4
ω = 34.4°
$D_2/F$ = 0.04
$D_4/D_T$ = 0.06

Those surfaces with a * to the right of the surface number in Table 9, above, are aspherical surfaces, and the aspherical surface shape is expressed by Equation (A) above. The values of each of the constants K and $A_4$–$A_{10}$ of the aspherical surfaces are shown in Table 10.

TABLE 10

| # | K | $A_4$ | $A_6$ | $A_8$ | $A_{10}$ |
|---|---|---|---|---|---|
| 1 | 1.0 | 0.8340849 × 10$^{-3}$ | −0.5165226 × 10$^{-5}$ | 0.4138435 × 10$^{-7}$ | 0.3616587 × 10$^{-9}$ |
| 2 | 1.0 | 0.1139223 × 10$^{-2}$ | −0.4197948 × 10$^{-4}$ | 0.4103195 × 10$^{-6}$ | −0.8943252 × 10$^{-9}$ |

Moreover, in Embodiment 5, as shown in the lower section of Table 9, the focal distance of the imaging lens is 4.52 mm, the back focus is 6.47 mm, the f-number is 2.4, and the half-image angle is 34.4°. In addition, the value of $D_2/F$ is 0.04, and the value of $D_4/D_T$ is 0.06, which satisfy the above conditions (1) and (2).

EMBODIMENT 6

The imaging lens of Embodiment 6 has a basic structure similar to that of Embodiment 1, illustrated in FIG. 1, but differs in that the first lens element $L_1$ is a biconvex plastic lens.

Table 11 below lists the surface number #, in order from the object side, the radius of curvature R (in mm) of each lens element surface near the optical axis, the on-axis spacing D (in mm) between each lens element surface, as well as the index of refraction $N_d$ and the Abbe number $V_d$ at the sodium d line of each lens element of Embodiment 6. Also, the focal distance F, the back focus Bf, the f-number $F_{NO}$, and the half-image angle ω, as well as the values of $D_2/F$ and $D_4/D_T$ of the imaging lens of this embodiment are listed in the lower part of Table 11.

TABLE 11

| # | R | D | $N_d$ | $V_d$ |
|---|---|---|---|---|
| 1* | 381.000 | 2.6 | 1.69660 | 53.1 |
| 2* | −25.534 | 0.2 | | |
| 3 | −26.421 | 0.7 | 1.77621 | 49.4 |
| 4 | 4.521 | 1.8 | | |
| 5 | 13.931 | 2.5 | 1.85504 | 23.6 |
| 6 | −14.273 | 4.6 | | |
| 7 | −15.199 | 0.7 | 1.85504 | 23.6 |
| 8 | 4.746 | 3.4 | 1.71615 | 53.7 |
| 9 | −6.135 | 0.2 | | |
| 10 | 10.048 | 2.5 | 1.83962 | 42.8 |
| 11 | −94.263 | 2.0 | | |
| 12 | ∞ | 2.3 | 1.51825 | 63.8 |
| 13 | ∞ | | | |

F = 4.35 mm
Bf = 6.22 mm
$F_{NO}$ = 2.4
ω = 35.7°
$D_2/F$ = 0.05
$D_4/D_T$ = 0.09

Those surfaces with a * to the right of the surface number in Table 11, above, are aspherical surfaces, and the aspherical surface shape is expressed by Equation (A) above. The values of each of the constants K and $A_4$–$A_{10}$ of the aspherical surfaces are shown in Table 12.

TABLE 12

| # | K | $A_4$ | $A_6$ | $A_8$ | $A_{10}$ |
|---|---|---|---|---|---|
| 1 | 1.0 | 0.7909541 × 10$^{-3}$ | −0.8001176 × 10$^{-5}$ | 0.4050043 × 10$^{-7}$ | 0.7635682 × 10$^{-9}$ |
| 2 | 1.0 | 0.1017230 × 10$^{-2}$ | −0.3736480 × 10$^{-4}$ | 0.5042474 × 10$^{-6}$ | −0.2393882 × 10$^{-8}$ |

Moreover, in Embodiment 6, as shown in the lower part of Table 11, the focal distance of the imaging lens is 4.35 mm, the back focus is 6.22 mm, the f-number is 2.4, and the half-image angle is 35.7°. In addition, the value of $D_2/F$ is 0.05, and the value of $D_4/D_T$ is 0.09, which satisfy the above conditions (1) and (2).

The spherical aberration, astigmatism (both sagittal and tangential), and distortion of the above Embodiments 1–6 are illustrated in FIGS. 4, 6, 8, 10, 12 and 14 respectively, and the coma of Embodiments 1–6 are shown in FIGS. 5, 7, 9, 11, 13, and 15, respectively. Moreover, the half-image angle ω is illustrated in these aberration figures. As is made clear in FIGS. 4–15, each embodiment of the present invention has acceptably low aberrations.

Moreover, it is also possible to replace the low-pass filter 3 in the gap between this imaging lens and the light receiving surface 2 of the solid-state image sensor, or to insert an infra-red radiation blocking filter, cover glass, or the like, along with the low-pass filter 3.

Of course, the imaging lens of this invention is not to be limited to the various embodiments specifically illustrated above. Rather the scope of the invention shall be defined as set forth in the following claims and their legal equivalents. Various modifications will occur to those skilled in the art as a result of reading the above description, and all such modifications as would be obvious to one of ordinary skill in the art are intended to be within the spirit of the invention disclosed.

What is claimed is:

1. An imaging lens comprising, in order from the object side:
   a first lens group of negative refractive power, said first lens group including
      a first lens element of positive refracting power and which has at least one aspherical surface,
      a second lens element that has negative refractive power, and
      a third lens element that has positive refractive power; and,
   a second lens group of positive refractive power,
   wherein the imaging lens is constructed to satisfy the following conditions $D_2/F<0.45$ $D_4/D_T<0.1$ where
      $D_2$ is the on-axis spacing between the first lens element and the second lens element,
      F is the focal length of the imaging lens,
      $D_4$ is on-axis spacing between the second lens element and the third lens element, and
      $D_T$ is the length of the imaging lens.

2. The imaging lens as set forth in claim 1, and further comprising said first lens element being composed of glass and having a shape that is either planoconvex or biconvex.

3. The imaging lens as set forth in claim 1, wherein each surface of said first lens element is aspheric.

4. The imaging lens as set forth in claim 1, wherein the construction parameters are as set forth below:

| # | R | D | $N_d$ | $V_d$ |
|---|---|---|---|---|
| 1 | ∞ | 3.0 | 1.69660 | 53.1 |
| 2 | −26.240 | 0.2 | | |
| 3 | −25.771 | 0.9 | 1.77621 | 49.4 |

-continued

| # | R | D | $N_d$ | $V_d$ |
|---|---|---|---|---|
| 4 | 4.521 | 1.2 | | |
| 5 | 14.142 | 2.6 | 1.85504 | 23.6 |
| 6 | −14.552 | 4.8 | | |
| 7 | −15.033 | 0.7 | 1.85504 | 23.6 |
| 8 | 4.738 | 3.6 | 1.71615 | 53.7 |
| 9 | −6.163 | 0.2 | | |
| 10 | 10.180 | 2.5 | 1.83962 | 42.8 |
| 11 | −102.999 | 2.0 | | |
| 12 | ∞ | 2.3 | 1.51825 | 63.8 |
| 13 | ∞ | | | | where # is the surface number, in order from the object side, R is the radius of curvature (in mm) of each lens element surface near the optical axis, D is the on-axis spacing (in mm) between each lens element surface, $N_d$ is the index of refraction and $V_d$ is the Abbe number at the sodium d line.

5. The imaging lens as set forth in claim 4, wherein each surface of said first lens element is aspheric.

6. The imaging lens as set forth in claim 1, wherein the construction parameters are as set forth below:

| # | R | D | $N_d$ | $V_d$ |
|---|---|---|---|---|
| 1 | ∞ | 2.5 | 1.69660 | 53.1 |
| 2 | −27.695 | 1.2 | | |
| 3 | −24.797 | 0.7 | 1.74690 | 49.0 |
| 4 | 4.500 | 1.0 | | |
| 5 | 15.104 | 2.5 | 1.85504 | 23.6 |
| 6 | −13.937 | 4.4 | | |
| 7 | −14.063 | 0.7 | 1.85504 | 23.6 |
| 8 | 4.685 | 3.4 | 1.73742 | 50.8 |
| 9 | −6.088 | 0.2 | | |
| 10 | 9.731 | 2.5 | 1.83929 | 37.1 |
| 11 | −88.565 | 2.0 | | |
| 12 | ∞ | 2.3 | 1.51825 | 63.8 |
| 13 | ∞ | | | | where # is the surface number, in order from the object side, R is the radius of curvature (in mm) of each lens element surface near the optical axis, D is the on-axis spacing (in mm) between each lens element surface, $N_d$ is the index of refraction and $V_d$ is the Abbe number at the sodium d line.

7. The imaging lens as set forth in claim 6, wherein each surface of said first lens element is aspheric.

8. The imaging lens as set forth in claim 1, wherein the construction parameters are as set forth below:

| # | R | D | $N_d$ | $V_d$ |
|---|---|---|---|---|
| 1 | ∞ | 2.5 | 1.69660 | 53.1 |
| 2 | −26.260 | 1.7 | | |
| 3 | −24.898 | 0.7 | 1.80831 | 46.3 |
| 4 | 4.500 | 0.9 | | |
| 5 | 14.613 | 2.5 | 1.85504 | 23.6 |
| 6 | −12.990 | 4.0 | | |
| 7 | −13.871 | 0.7 | 1.85504 | 23.6 |
| 8 | 4.664 | 3.4 | 1.74690 | 49.0 |
| 9 | −6.015 | 0.2 | | |
| 10 | 9.852 | 2.5 | 1.83929 | 37.1 |
| 11 | −102.548 | 2.0 | | |
| 12 | ∞ | 2.3 | 1.51825 | 63.8 |
| 13 | ∞ | | | | where # is the surface number, in order from the object side, R is the radius of curvature (in mm) of each lens element surface near the optical axis, D is the on-axis spacing (in mm) between each lens element surface, $N_d$ is the index of refraction and $V_d$ is the Abbe number at the sodium d line.

9. The imaging lens as set forth in claim 8, wherein each surface of said first lens element is aspheric.

10. The imaging lens as set forth in claim 1, wherein the construction parameters are as set forth below:

| # | R | D | $N_d$ | $V_d$ |
|---|---|---|---|---|
| 1 | ∞ | 2.5 | 1.77621 | 49.4 |
| 2 | −38.497 | 0.2 | | |
| 3 | 30.000 | 0.7 | 1.83962 | 42.8 |
| 4 | 4.500 | 1.3 | | |
| 5 | 18.069 | 2.5 | 1.85504 | 23.6 |
| 6 | −17.387 | 5.2 | | |
| 7 | −13.225 | 0.7 | 1.85504 | 23.6 |
| 8 | 4.600 | 3.4 | 1.73234 | 54.4 |
| 9 | −6.028 | 0.2 | | |
| 10 | 9.285 | 2.5 | 1.83962 | 42.8 |
| 11 | −116.815 | 2.0 | | |
| 12 | ∞ | 2.3 | 1.51825 | 63.8 |
| 13 | ∞ | | | | where # is the surface number, in order from the object side, R is the radius of curvature (in mm) of each lens element surface near the optical axis, D is the on-axis spacing (in mm) between each lens element surface, $N_d$ is the index of refraction and $V_d$ is the Abbe number at the sodium d line.

11. The imaging lens as set forth in claim 10, wherein each surface of said first lens element is aspheric.

12. The imaging lens as set forth in claim 1, wherein the construction parameters are as set forth below:

| # | R | D | $N_d$ | $V_d$ |
|---|---|---|---|---|
| 1 | 412.575 | 3.1 | 1.49217 | 57.3 |
| 2 | −24.916 | 0.2 | | |
| 3 | −25.106 | 0.7 | 1.71615 | 53.7 |
| 4 | 4.500 | 1.1 | | |
| 5 | 14.011 | 2.5 | 1.85504 | 23.6 |
| 6 | −14.811 | 5.0 | | |
| 7 | −15.111 | 0.7 | 1.85504 | 23.6 |
| 8 | 4.731 | 3.6 | 1.71615 | 53.7 |
| 9 | −6.126 | 0.2 | | |
| 10 | 9.873 | 2.5 | 1.83962 | 42.8 |
| 11 | −89.575 | 2.0 | | |
| 12 | ∞ | 2.3 | 1.51825 | 63.8 |
| 13 | ∞ | | | | where # is the surface number, in order from the object side, R is the radius of curvature (in mm) of each lens element surface near the optical axis, D is the on-axis spacing (in mm) between each lens element surface, $N_d$ is the index of refraction and $V_d$ is the Abbe number at the sodium d line.

13. The imaging lens as set forth in claim 12, wherein each surface of said first lens element is aspheric.

14. The imaging lens as set forth in claim 1, wherein the construction parameters are as set forth below:

| # | R | D | $N_d$ | $V_d$ |
|---|---|---|---|---|
| 1 | 381.000 | 2.6 | 1.69660 | 53.1 |
| 2 | −25.534 | 0.2 | | |
| 3 | −26.421 | 0.7 | 1.77621 | 49.4 |
| 4 | 4.521 | 1.8 | | |
| 5 | 13.931 | 2.5 | 1.85504 | 23.6 |
| 6 | −14.273 | 4.6 | | |

-continued

| # | R | D | $N_d$ | $V_d$ |
|---|---|---|---|---|
| 7 | −15.199 | 0.7 | 1.85504 | 23.6 |
| 8 | 4.746 | 3.4 | 1.71615 | 53.7 |
| 9 | −6.135 | 0.2 | | |
| 10 | 10.048 | 2.5 | 1.83962 | 42.8 |
| 11 | −94.263 | 2.0 | | |
| 12 | ∞ | 2.3 | 1.51825 | 63.8 |
| 13 | ∞ | | | | where # is the surface number, in order from the object side, R is the radius of curvature (in mm) of each lens element surface near the optical axis, D is the on-axis spacing (in mm) between each lens element surface, $N_d$ is the index of refraction and $V_d$ is the Abbe number at the sodium d line.

15. The imaging lens as set forth in claim 14, wherein each surface of said first lens element is aspheric.

* * * * *

UNITED STATES PATENT AND TRADEMARK OFFICE
CERTIFICATE OF CORRECTION

PATENT NO. : 5,999,338
DATED : Dec. 7, 1999
INVENTOR(S) : Akiko Nagahara

It is certified that error appears in the above-identified patent and that said Letters Patent is hereby corrected as shown below:

On the title page, item,

-- [30]   Foreign Application Priority Data
June 2, 1998 [JP] Japan 10-169242  --

Signed and Sealed this

Thirtieth Day of May, 2000

Attest:

Q. TODD DICKINSON

*Attesting Officer*        *Director of Patents and Trademarks*